United States Patent
Chin et al.

(10) Patent No.: US 12,167,366 B2
(45) Date of Patent: Dec. 10, 2024

(54) PERFORMING A CONNECTION SETUP BASED AT LEAST IN PART ON A PAGING MESSAGE

(71) Applicant: QUALCOMM Incorporated, San Diego, CA (US)

(72) Inventors: Tom Chin, San Diego, CA (US); Peter Pui Lok Ang, San Diego, CA (US); Reza Shahidi, La Jolla, CA (US); Kuo-Chun Lee, San Diego, CA (US); Wei-Jei Song, San Diego, CA (US); Arvind Vardarajan Santhanam, San Diego, CA (US); Rajeev Pal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/660,338

(22) Filed: Apr. 22, 2022

(65) Prior Publication Data
US 2023/0345416 A1   Oct. 26, 2023

(51) Int. Cl.
*H04W 68/02* (2009.01)
*H04W 76/10* (2018.01)
*H04W 76/38* (2018.01)

(52) U.S. Cl.
CPC ........... *H04W 68/02* (2013.01); *H04W 76/10* (2018.02); *H04W 76/38* (2018.02)

(58) Field of Classification Search
CPC ..... H04W 68/02; H04W 76/10; H04W 76/38; H04W 88/06
(Continued)

(56) References Cited

U.S. PATENT DOCUMENTS 9,313,109 B1 * 4/2016 Majumder ........... H04B 17/382
2014/0194111 A1 * 7/2014 Aso ................... H04W 52/0235
455/419
(Continued)

FOREIGN PATENT DOCUMENTS

WO   WO-2018053746 A1 *  3/2018  ............... H04B 1/00

OTHER PUBLICATIONS

Nokia et al. "Discussion on MUSIM band conflict scenarios" 3GPP Draft; R2-2202752, 3rd generation partnership project (3 GPP), Mobile competence center; 650,Route Des Lucioles; F-06921 Sohipa-Antipolis Cedex; France (Year: 2022).*
(Continued)

*Primary Examiner* — Tanmay K Shah
(74) *Attorney, Agent, or Firm* — Harrity & Harrity, LLP

(57) ABSTRACT

Various aspects of the present disclosure generally relate to wireless communication. In some aspects, a user equipment (UE) may establish, by a first subscription of the UE, a connection to a first network entity using two transmit (Tx) chains of the UE. The UE may receive, by a second subscription of the UE, a paging message from a second network entity. The UE may receive, by the first subscription from the second subscription, a request for the first subscription to enter a mode that supports one Tx chain. The UE, by the first subscription, may reduce the two Tx chains to the one Tx chain for the first subscription. The UE may perform, by the second subscription to the second network entity, the connection setup based at least in part on the first subscription reducing the two Tx chains to the one Tx chain. Numerous other aspects are described.

30 Claims, 11 Drawing Sheets

(58) Field of Classification Search
USPC .......................................................... 455/458
See application file for complete search history.

(56) References Cited

U.S. PATENT DOCUMENTS

2018/0368098 A1* 12/2018 Gopal ..................... H04W 4/50
2019/0208543 A1*  7/2019 Dhanapal ............ H04W 72/541

OTHER PUBLICATIONS

International Search Report and Written Opinion—PCT/US2023/018520—ISA/EPO—Jul. 24, 2023.
Nokia, et al., "Discussion on MUSIM Band Conflict Scenarios", 3GPP TSG-RAN WG2 Meeting #117 Electronic, R2-2202752, 3rd Generation Partnership Project, Mobile Competence Centre, 650, Route Des Lucioles, F-06921 Sophia-Antipolis Cedex, France, vol. RAN WG2, No. Electronic, Feb. 21, 2022-Mar. 3, 2022, Feb. 13, 2022, 4 Pages, XP052131200, paragraph [0003]-[03.1].

* cited by examiner

PERFORMING A CONNECTION SETUP BASED AT LEAST IN PART ON A PAGING MESSAGE

FIELD OF THE DISCLOSURE

Aspects of the present disclosure generally relate to wireless communication and to techniques and apparatuses for performing a connection setup based at least in part on a paging message.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: establish, by a first subscription of the UE, a connection to a first network entity using two transmit (Tx) chains of the UE during a connected mode of the first subscription; receive, by a second subscription of the UE, a paging message from a second network entity during an idle mode of the second subscription, wherein a connection setup between the second subscription and the second network entity is temporarily held after the paging message is received from the second network entity; receive, by the first subscription from the second subscription and based at least in part on the paging message, a request for the first subscription to enter a mode that supports one Tx chain; reduce, by the first subscription, the two Tx chains to the one Tx chain for the first subscription based at least in part on the request for the first subscription to enter the mode; and perform, by the second subscription to the second network entity, the connection setup based at least in part on the first subscription reducing the two Tx chains to the one Tx chain.

In some implementations, a method of wireless communication performed by a UE includes establishing, by a first subscription of the UE, a connection to a first network entity using two Tx chains of the UE during a connected mode of the first subscription; receiving, by a second subscription of the UE, a paging message from a second network entity during an idle mode of the second subscription, wherein a connection setup between the second subscription and the second network entity is temporarily held after the paging message is received from the second network entity; receiving, by the first subscription from the second subscription and based at least in part on the paging message, a request for the first subscription to enter a mode that supports one Tx chain; reducing, by the first subscription, the two Tx chains to the one Tx chain for the first subscription based at least in part on the request for the first subscription to enter the mode; and performing, by the second subscription to the second network entity, the connection setup based at least in part on the first subscription reducing the two Tx chains to the one Tx chain.

In some implementations, a non-transitory computer-readable medium storing a set of instructions for wireless communication includes one or more instructions that, when executed by one or more processors of a UE, cause the UE to: establish, by a first subscription of the UE, a connection to a first network entity using two Tx chains of the UE during a connected mode of the first subscription; receive, by a second subscription of the UE, a paging message from a second network entity during an idle mode of the second subscription, wherein a connection setup between the second subscription and the second network entity is temporarily held after the paging message is received from the second network entity; receive, by the first subscription from the second subscription and based at least in part on the paging message, a request for the first subscription to enter a mode that supports one Tx chain; reduce, by the first subscription, the two Tx chains to the one Tx chain for the first subscription based at least in part on the request for the first subscription to enter the mode; and perform, by the second subscription to the second network entity, the connection setup based at least in part on the first subscription reducing the two Tx chains to the one Tx chain.

In some implementations, an apparatus for wireless communication includes means for establishing, by a first subscription of the apparatus, a connection to a first network entity using two Tx chains of the apparatus during a connected mode of the first subscription; means for receiving, by a second subscription of the apparatus, a paging message from a second network entity during an idle mode of the second subscription, wherein a connection setup between the second subscription and the second network entity is temporarily held after the paging message is received from the second network entity; means for receiving, by the first subscription from the second subscription and based at least in part on the paging message, a request for the first subscription to enter a mode that supports one Tx chain; means for reducing, by the first subscription, the two Tx chains to the one Tx chain for the first subscription based at least in part on the request for the first subscription to enter the mode; and means for performing, by the second subscription to the second network entity, the connection setup based at least in part on the first subscription reducing the two Tx chains to the one Tx chain.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
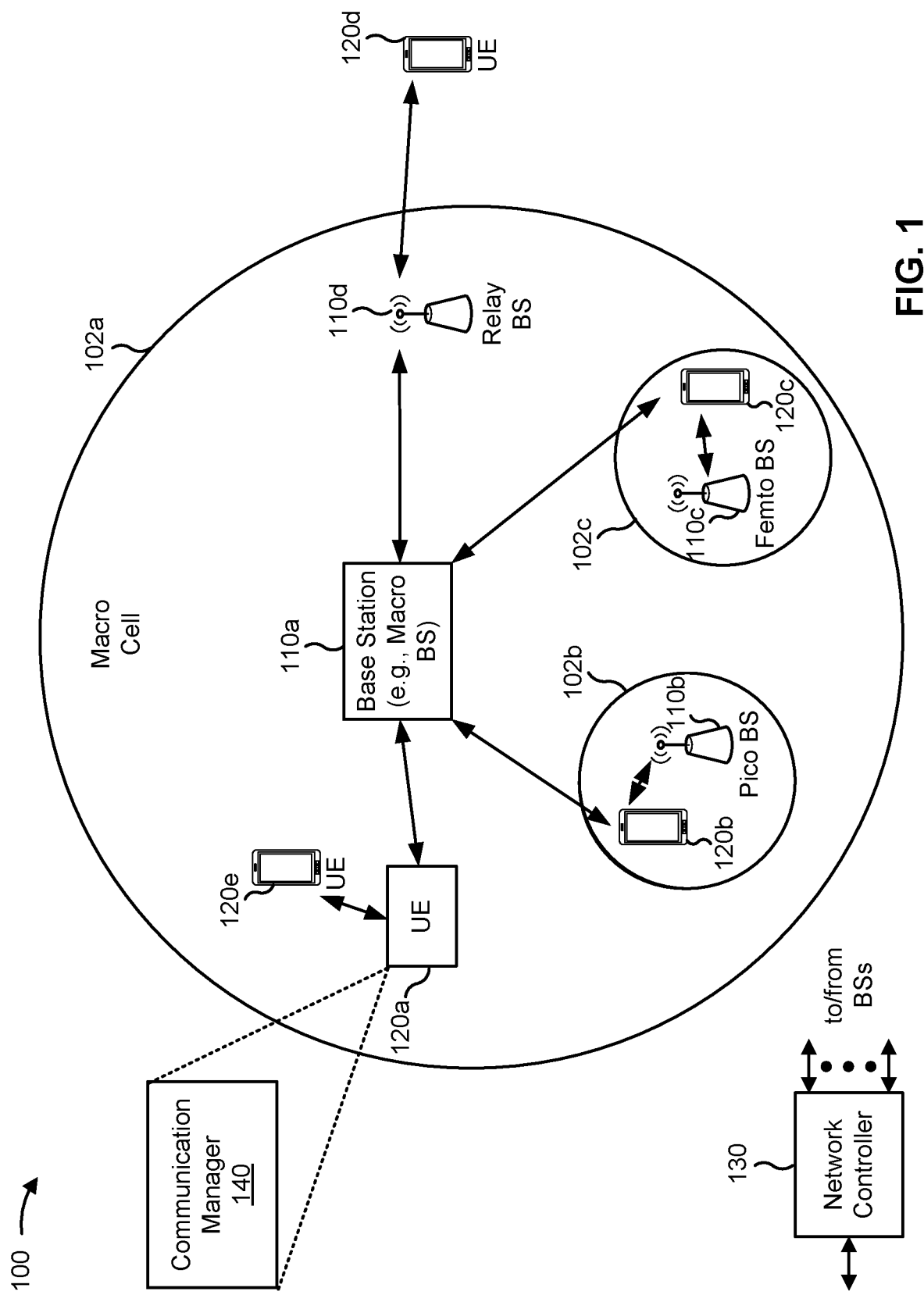
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may establish, by a first subscription of the UE, a connection to a first network entity using two transmit (Tx) chains of the UE during a connected mode of the first subscription; receive, by a second subscription of the UE, a paging message from a second network entity during an idle mode of the second subscription, wherein a connection setup between the second subscription and the second network entity is temporarily held after the paging message is received from the second network entity; receive, by the first subscription from the second subscription and based at least in part on the paging message, a request for the first subscription to enter a mode that supports one Tx chain; reduce, by the first subscription, the two Tx chains to the one Tx chain for the first subscription based at least in part on the request for the first subscription to enter the mode; and perform, by the second subscription to the second network entity, the connection setup based at least in part on the first subscription reducing the two Tx chains to the one Tx chain. Additionally, or alternatively, the communication manager 140 may perform one or more other operations described herein.

As indicated above, FIG. 1 is provided as an example. Other examples may differ from what is described with regard to FIG. 1.

Figure 2:
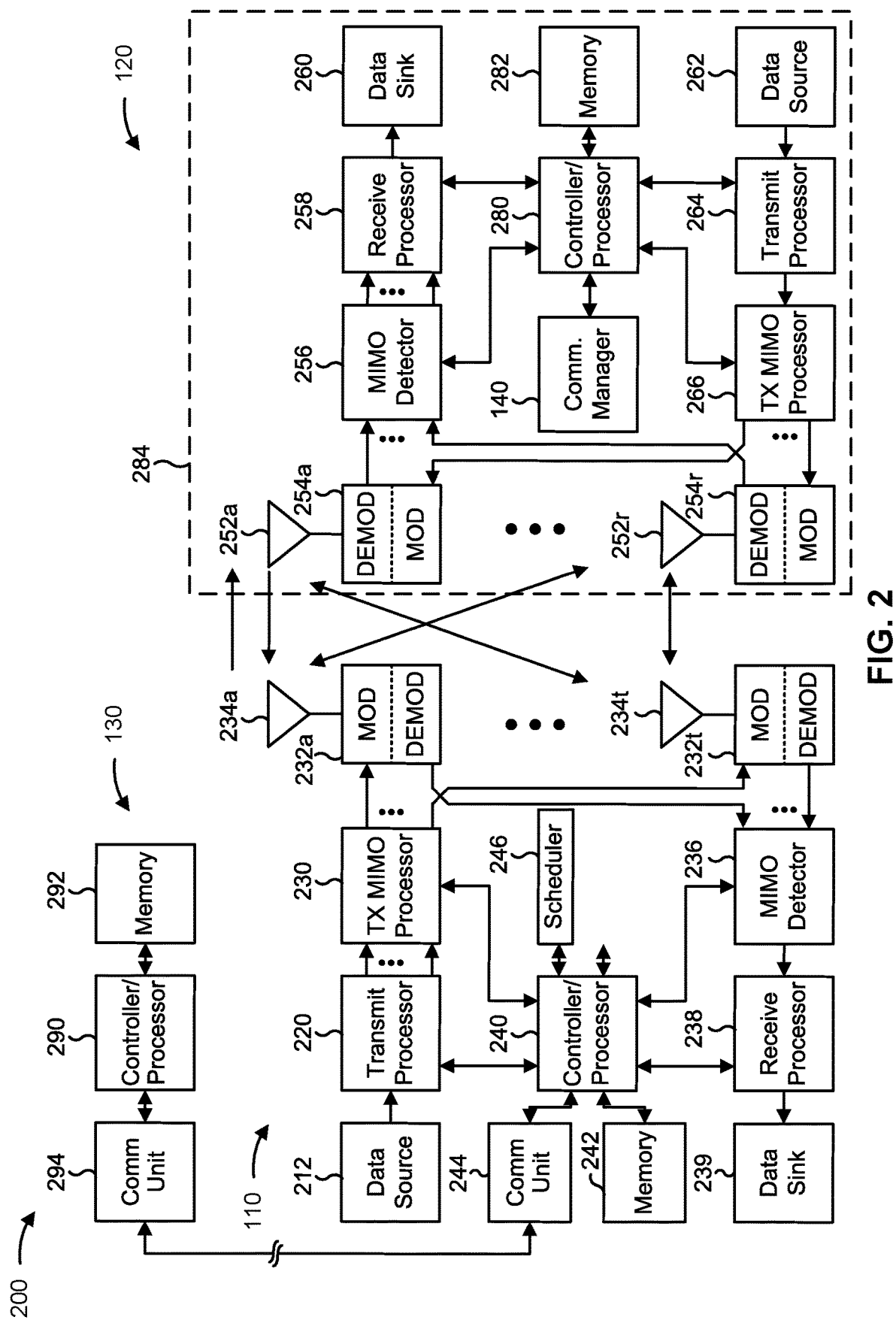
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with performing a connection setup based at least in part on a paging message, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., UE 120) includes means for establishing, by a first subscription of the UE, a connection to a first network entity using two Tx chains of the UE during a connected mode of the first subscription; means for receiving, by a second subscription of the UE, a paging message from a second network entity during an idle mode of the second subscription, wherein a connection setup between the second subscription and the second network entity is temporarily held after the paging message is received from the second network entity; means for receiving, by the first subscription from the second subscription and based at least in part on the paging message, a request for the first subscription to enter a mode that supports one Tx chain; means for reducing, by the first subscription, the two Tx chains to the one Tx chain for the first subscription based at least in part on the request for the first subscription to enter the mode; and/or means for performing, by the second subscription to the second network entity, the connection setup based at least in part on the first subscription reducing the two Tx chains to the one Tx chain. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
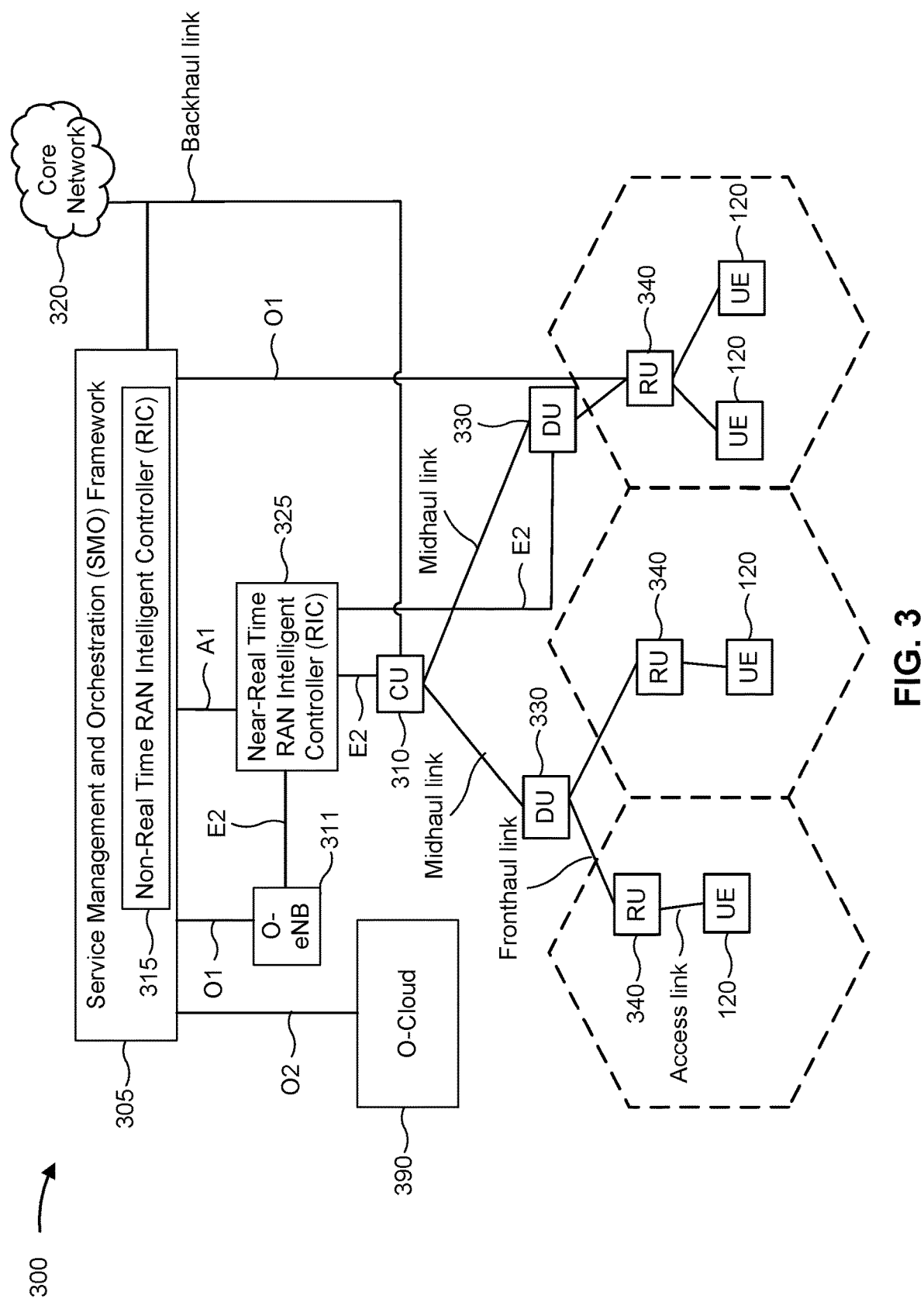
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration.

The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

A UE that supports a dual subscriber identification module (SIM) dual-active (DSDA) mode may include two SIM cards that have the capability to operate in two separate networks. The two SIM cards may be associated with two separate subscriptions. For example, each SIM card may store network-specific information used to authenticate and identify subscribers on a specific network. A first SIM card may be associated with a first subscription, and a second SIM card may be associated with a second subscription. The first subscription may be associated with a first RAT, such as NR. The second subscription may be associated with a second RAT, such as NR or LTE. The first subscription may be associated with a first network operator, and the second subscription may be associated with a second network operator. The UE may have one or more Tx chains that allow for dual uplink connections, such that the two separate subscriptions may support uplink at a same time. In other words, the UE may support "full concurrency," since the one or more Tx chains may concurrently support the two separate subscriptions at the same time. The DSDA mode may allow the first subscription to be in a connected mode, and the second subscription may concurrently set up a voice call.

The UE may include a first Tx chain associated with the first subscription. The first Tx chain may perform uplink transmissions to a first network node. The UE may include a second Tx chain associated with the second subscription. The second Tx chain may perform uplink transmissions to a second network node. Alternatively, the UE may include a single Tx chain associated with both the first subscription and the second subscription based on a time division scheme of the single Tx chain between the first subscription and the second subscription. The first network node may be associated with a first network, and the second network node may be associated with a second network. In some cases, the first network node and the second network node may be a same network node in a same network.

In some cases, the UE may include multiple SIM cards (e.g., two or more SIM cards) associated with multiple subscriptions (e.g., two or more subscriptions), respectively. In this case, the UE may include multiple Tx chains (e.g., two or more Tx chains) corresponding to the multiple SIM cards and the multiple subscriptions, respectively.

The UE may also support a dual SIM dual-standby (DSDS) mode. When the UE operates in the DSDS mode, the first Tx chain associated with the first subscription may be in a connected state, and the second Tx chain associated with the second subscription may be in an idle state. The first subscription may simultaneously use the first Tx chain and the second Tx chain for uplink MIMO. In other words, the first subscription may use two Tx chains for uplink MIMO when the first subscription is associated with the connected state and when the second subscription is associated with the idle state. When the second subscription is associated with the idle state, the second subscription may use neither the first Tx chain nor the second Tx chain.

The UE may exit the DSDS mode and enter the DSDA mode. When the UE exits the DSDS mode and enters and the DSDA mode, the first subscription and the second subscription may each only use a single Tx chain, and an uplink MIMO associated with the DSDS mode may fall back to an uplink single-input single-output (SISO). In other words, during the DSDS mode, the first subscription may use both Tx chains, but after exiting the DSDS mode and entering the DSDA mode, the first subscription may only use the first Tx chain, and the second Tx chain may be used by the second subscription. The first subscription may move from using two Tx chains to one Tx chains when transitioning between the DSDS mode and the DSDA mode.

As an example, the UE may enter an NR and NR DSDA, in which the first subscription and the second subscription may both be associated with NR. The first subscription and the second subscription may each only use one Tx chain, and an uplink MIMO may fall back to an uplink SISO. The UE may transmit UE assistance information (UAI) to request an uplink MIMO reduction to reduce to the one Tx chain.

The DSDA mode may involve a component carrier reduction. A default data subscription (DDS), such as the first subscription, may only support two downlink component carriers and one uplink component carrier. A non-default data subscription (nDDS), such as the second subscription, may only support one downlink component carrier and one uplink component carrier. Further, when the first subscription and the second subscription are connected in a band combination, the first subscription and the second subscription may each use two downlink MIMO layers instead of four downlink MIMO layers.

When the first subscription is in the connected mode and the second subscription is in an idle mode, the second subscription may receive a paging message. The first subscription may reduce a quantity of Tx chains from two Tx chains to one Tx chain, but a network may not be notified of the reduction until a period of time has passed. During this period of time, a relatively high block error rate (BLER) may occur because the network may operate under an assumption that the first subscription still supports uplink MIMO layers, and the network may accordingly allocate uplink grants with MIMO layers.

Figure 4:
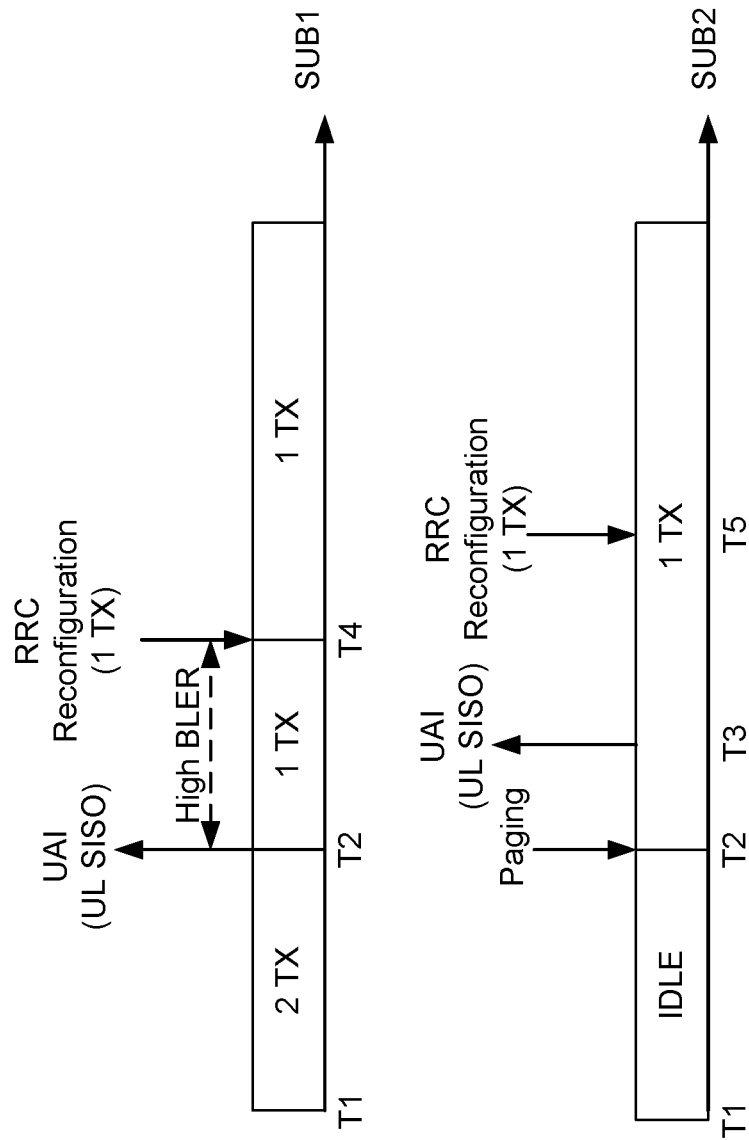
FIG. 4 is a diagram illustrating an example of operations at a first subscription and a second subscription of a UE, in accordance with the present disclosure.

FIG. 4 is a diagram illustrating an example 400 of operations at a first subscription and a second subscription of a UE, in accordance with the present disclosure.

As shown in FIG. 4, at a first time (T1), the first subscription may operate using two Tx chains and the second subscription may be idle. At a second time (T2), the second subscription may receive a paging message, and the first subscription may tI am finishing a subscription may transmit a UAI, which may indicate a request for uplink SISO. At a fourth time (T4), the first subscription may receive an RRC reconfiguration that indicates one Tx chain. The first subscription may experience a relatively high BLER between the second time and the fourth time (e.g., until receiving the RRC reconfiguration that indicates one Tx chain), since a network may still operate under an assumption that the first subscription still supports the two Tx chains. At the fourth time, after the RRC reconfiguration that indicates one Tx chain is received, the first subscription may operate using the one Tx chain without the relatively high BLER. At a fifth time (T5), the second subscription may receive an RRC reconfiguration that indicates one Tx chain.

The first subscription may experience the relatively high BLER between the second time (at which the first subscription switches from the two Tx chains to the one Tx chain) and the fourth time (at which the first subscription receives the RRC reconfiguration that indicates one Tx chain). The relatively high BLER may degrade a performance of the first subscription.

The first subscription may immediately switch to the one Tx chain after transmitting the UAI, and the second subscription may immediately switch to one Tx chain after receiving the paging message, which may cause the first subscription to experience the relatively high BLER. The second subscription may immediately switch to one Tx chain after receiving the paging message, which may force the first subscription to use the one Tx chain. After the first subscription starts to use the one Tx chain, the relatively high BLER may result due to the network operating under an assumption that the first subscription is capable of two Tx chains (as well as four downlink MIMO layers, three downlink component carriers, and two uplink component carriers).

As indicated above, FIG. 4 is provided as an example. Other examples may differ from what is described with regard to FIG. 4.

In various aspects of techniques and apparatuses described herein, a UE may establish, by a first subscription of the UE, a connection to a first network entity using two Tx chains of the UE during a connected mode of the first subscription. The UE may receive, by a second subscription of the UE, a paging message from a second network entity during an idle mode of the second subscription. The second subscription may temporarily hold a connection setup with the second network entity after the paging message is received from the second network entity. The UE may receive, by the first subscription from the second subscription and based at least in part on the paging message, a request for the first subscription to enter a mode that supports one Tx chain. The UE may reduce, by the first subscription, the two Tx chains to the one Tx chain for the first subscription based at least in part on the request for the first subscription to enter the mode. The UE may perform, by the second subscription to the second network entity, the connection setup based at least in part on the first subscription reducing the two Tx chains to the one Tx chain. The second subscription may temporarily hold the connection setup with the second network entity to avoid a relatively high BLER at the first subscription after reducing the two Tx chains to the one Tx chain. By temporarily holding the connection setup, the first subscription may avoid experiencing the relatively high BLER immediately after switching to the one Tx chain, thereby improving a performance of the first subscription.

Figure 5:
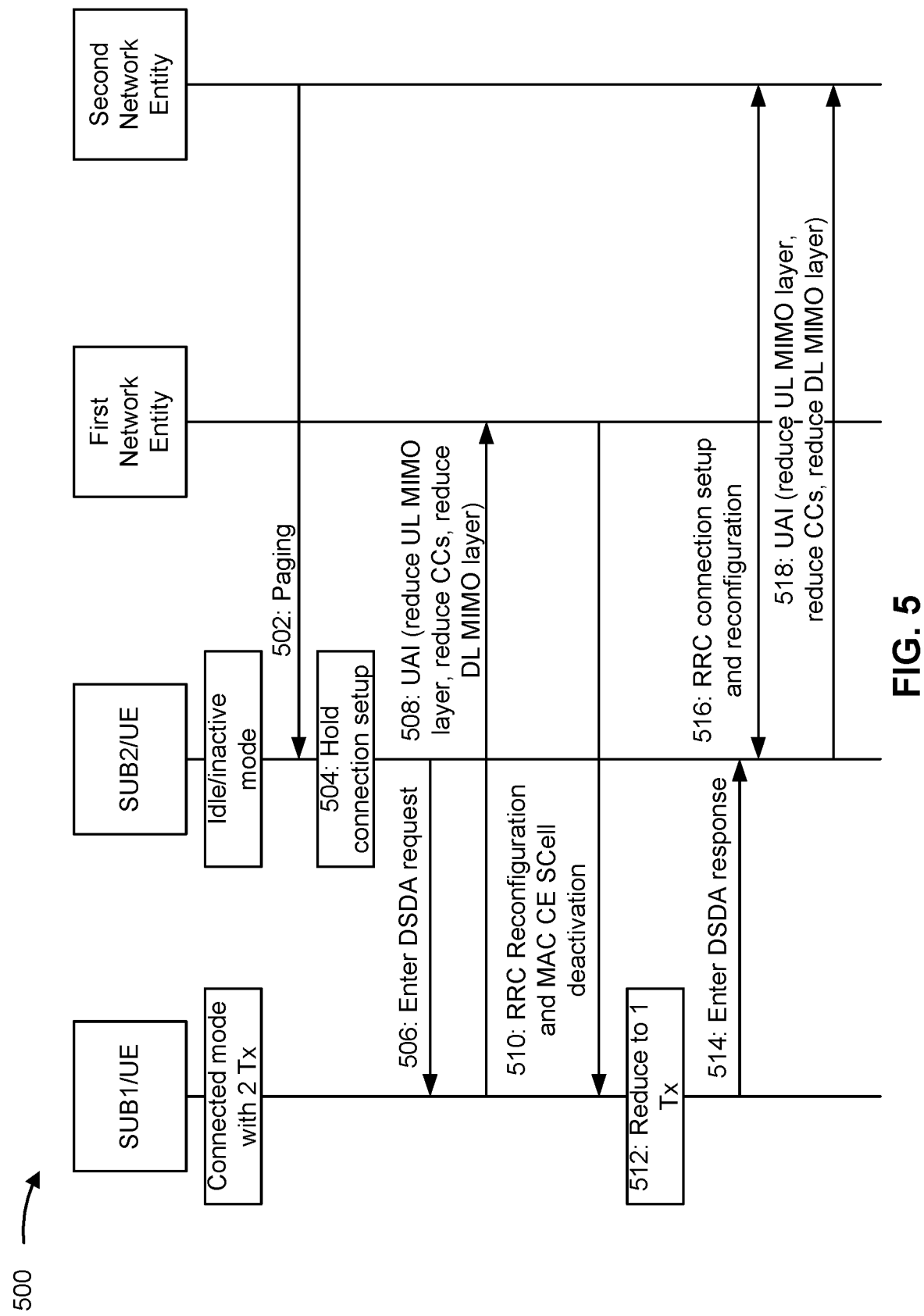
FIGS. 5-9 are diagrams illustrating examples associated with performing a connection setup based at least in part on a paging message, in accordance with the present disclosure.

FIG. 5 is a diagram illustrating an example 500 associated with performing a connection setup based at least in part on a paging message, in accordance with the present disclosure. As shown in FIG. 5, example 500 includes communication between a UE (e.g., UE 120), a first network entity (e.g., base station 110*a*), and a second network entity (e.g., base station 110*e*). In some aspects, the UE, the first network entity, and the second network entity may be included in a wireless network, such as wireless network 100.

In some aspects, the UE may include a first subscription (SUB1) and a second subscription (SUB2). The first subscription may be associated with the first network entity, and the second subscription may be associated with the second network entity. The first subscription may communicate to the first network entity, and the second subscription may communicate to the second network entity. The UE may include two Tx chains. The UE may establish, via the first subscription, a connection to the first network entity using the two Tx chains of the UE during a connected mode of the first subscription.

In some aspects, the first subscription may be associated with the connected mode, during which the first subscription may communicate with the first network entity using the two Tx chains. The second subscription may be associated with an idle/inactive mode, during which the first subscription may not use either of the two Tx chains to communicate with the second network entity. The UE may operate in a DSDS mode when the first subscription uses the two Tx chains, and the second subscription is in the idle/inactive mode.

As shown by reference number 502, when the second subscription is in the idle/inactive mode, the second subscription may receive a paging message from the second network entity. The second subscription may receive the paging message from the second network entity during the idle mode of the second subscription. The second subscription may receive the paging message when the first subscription is in the connected mode and using the two Tx chains.

As shown by reference number 504, after receiving the paging message from the second network entity, the second subscription may temporarily hold a connection setup. The connection setup between the second subscription and the second network entity may be temporarily held after the paging message is received from the second network entity. In other words, the second subscription may not immediately respond with a paging response to the second network entity. The paging response may not be time critical, and the second subscription may typically take up to a few seconds to respond to the second network entity. Further, the second network entity may transmit another paging message to the second subscription when the second network entity does not receive the paging response within a certain period of time.

As shown by reference number 506, the second subscription may transmit, to the first subscription, a request for the first subscription to enter a DSDA mode, in which the first subscription may operate using one Tx chain and the second subscription may operate using one Tx chain. The UE may receive, by the first subscription from the second subscription and based at least in part on the paging message, the request for the first subscription to enter the DSDA mode that supports the one Tx chain. The second subscription may notify the first subscription to enter the DSDA mode based at least in part on the second subscription receiving the paging message and temporarily holding the connection setup.

As shown by reference number 508, the UE may transmit, by the first subscription to the first network entity and based at least in part on the request for the first subscription to enter the mode, UAI that indicates a request for an uplink MIMO layer reduction, a request for a component carrier (CC) reduction, and/or a request for a downlink MIMO layer reduction. The first subscription may transmit the UAI to the first network entity. The first subscription may transmit the UAI based at least in part on the first subscription receiving the request from the second subscription. The UAI may request the uplink MIMO layer reduction, which may be based at least in part on a reduction from two Tx chains to one Tx chain. The UAI may request a reduction from uplink MIMO (e.g., two Tx chains) to uplink SISO (e.g., one Tx chain). The UAI may include a request for uplink SISO. The UAI may request the component carrier reduction and/or the downlink MIMO layer reduction.

As shown by reference number 510, the UE may receive, by the first subscription from the first network entity and based at least in part on the UAI, a network response that indicates the one Tx chain for the first subscription. The first subscription may receive, from the first network entity, the network response based at least in part on the UAI. The network response may include an RRC reconfiguration message. The RRC reconfiguration message may indicate a change to uplink SISO, which may be based at least in part on the UAI that requested the uplink MIMO layer reduction. The RRC reconfiguration message may indicate the component carrier reduction and/or the downlink MIMO layer reduction (e.g., a reduction to two downlink MIMO layers). In other words, the RRC reconfiguration may indicate an uplink SISO layer configuration, the component carrier reduction, and/or the downlink MIMO layer reduction. In some aspects, the UE may receive, by the first subscription from the first network entity and based at least in part on the UAI, a medium access control control element (MAC-CE) secondary cell (SCell) deactivation to reduce a quantity of component carriers associated with the first subscription. The network response may include the MAC-CE SCell deactivation to reduce the quantity of component carriers.

As shown by reference number 512, the first subscription may reduce the two Tx chains to one Tx chain, based at least in part on the network response (e.g., the RRC reconfiguration and/or the MAC-CE SCell deactivation) received from the first network entity. The UE may reduce, by the first subscription, the two Tx chains to the one Tx chain for the first subscription based at least in part on the request for the first subscription to enter the DSDA mode. The first subscription may enter the DSDA mode and reduce to the one Tx chain.

As shown by reference number 514, the UE may transmit, by the first subscription to the second subscription and based at least in part on the first subscription reducing the two Tx chains to the one Tx chain, an indication that the second subscription is now suited to enter the mode that supports DSDA. The first subscription may transmit, to the second subscription, the indication that the DSDA mode is now suitable for the second subscription. The first subscription may transmit the indication after the first subscription reduces to the one Tx chain.

As shown by reference number 516, the UE may perform, by the second subscription to the second network entity, the connection setup based at least in part on the first subscription reducing the two Tx chains to the one Tx chain. The second subscription may resume the connection setup based at least in part on the indication received from the first subscription. The second subscription may resume the connection setup, which was previously placed on a temporary hold by the second subscription after receiving the paging message. The second subscription may transmit the paging response, such as an RRC connection setup message, to the second network entity. The second subscription may receive an RRC reconfiguration message from the network entity based at least in part on the RRC connection setup message. The second subscription may transmit, to the second network entity and based at least in part on entering the mode that supports DSDA, the paging response for performing the connection setup. The second subscription may receive, from the second network entity and based at least in part on the connection setup of the second subscription, a reconfiguration (e.g., the RRC reconfiguration message) associated with entering the mode that supports DSDA. In other words, the reconfiguration may be based at least in part on the second subscription now being suitable to enter the mode that supports DSDA.

As shown by reference number 518, the UE may transmit, by the second subscription to the second network entity and based at least in part on the connection setup of the second subscription, UAI that indicates a request for an uplink MIMO layer reduction, a request for a component carrier reduction, or a request for a downlink MIMO layer reduction. The second subscription may transmit the UAI to the second network entity. The second subscription may transmit the UAI based at least in part on the second subscription receiving the RRC reconfiguration message from the second network entity. The UAI may request the uplink MIMO layer reduction, when the second subscription previously indicated a support for uplink MIMO layers. The UAI may request the component carrier reduction and/or the downlink MIMO layer reduction. The UAI may indicate a request for uplink SISO.

In some aspects, the second subscription may temporarily hold the connection setup after receiving the paging message from the second network entity, which may prevent the second subscription from immediately switching to one Tx chain. The second subscription may switch to the one Tx chain at approximately the same time as the first subscription switching from the two Tx chains to the one Tx chain, which may prevent the first subscription from experiencing a relatively high BLER. Otherwise, the second subscription may immediately switch to the one Tx chain, and the first subscription would be forced to also switch to the one Tx chain, but the first subscription would suffer from the relatively high BLER as a result because the first network entity would still consider the first subscription of being capable of supporting the two Tx chains.

As indicated above, FIG. 5 is provided as an example. Other examples may differ from what is described with regard to FIG. 5.

Figure 6:
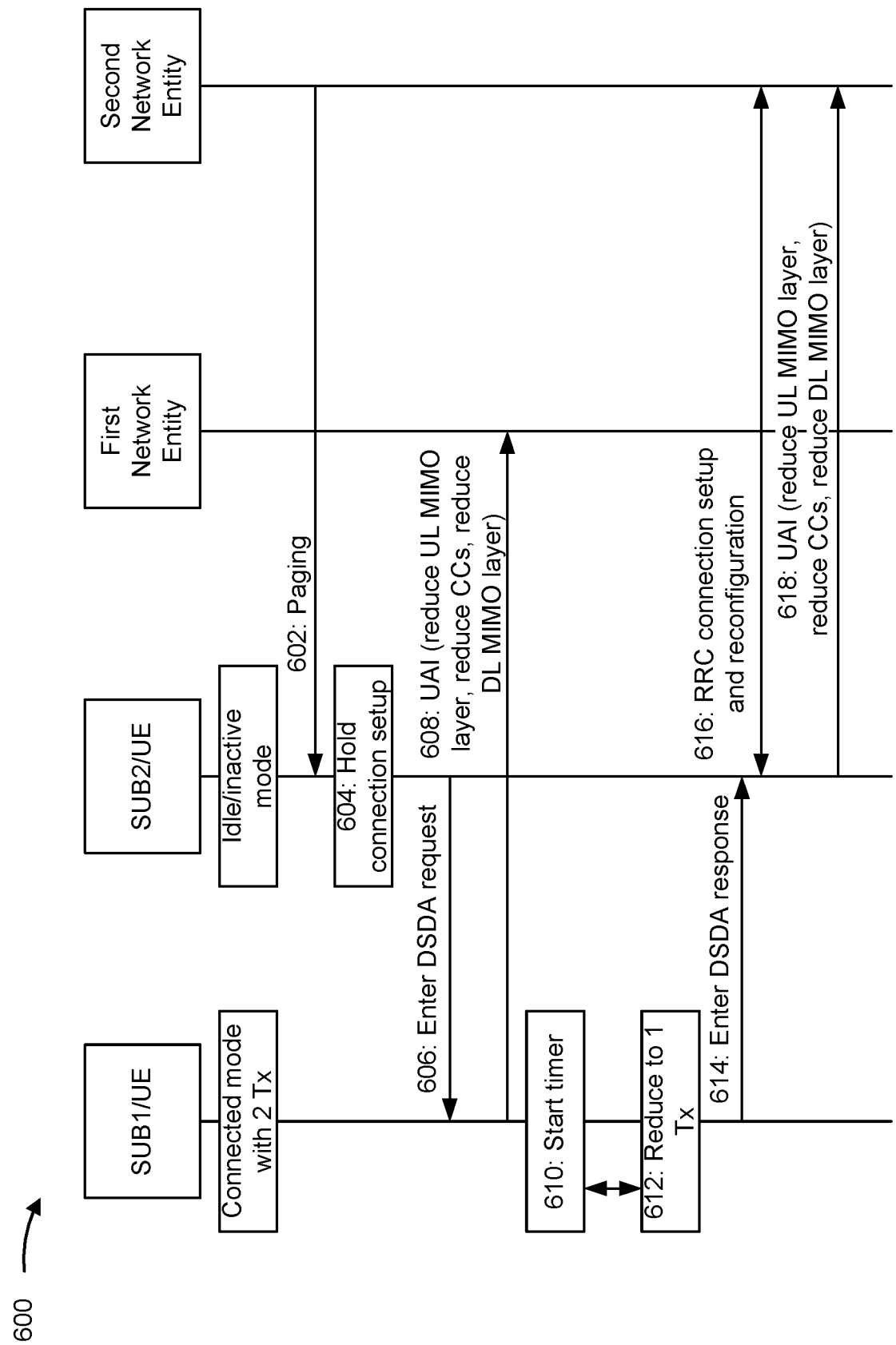

FIG. 6 is a diagram illustrating an example 600 associated with performing a connection setup based at least in part on a paging message, in accordance with the present disclosure. As shown in FIG. 6, example 600 includes communication between a UE (e.g., UE 120), a first network entity (e.g., base station 110a), and a second network entity (e.g., base station 110e). In some aspects, the UE, the first network entity, and the second network entity may be included in a wireless network, such as wireless network 100.

In some aspects, the UE may include a first subscription and a second subscription. The first subscription may be associated with the first network entity, and the second subscription may be associated with the second network entity. The first subscription may communicate to the first network entity, and the second subscription may communicate to the second network entity. The UE may include two Tx chains.

In some aspects, the first subscription may be associated with a connected mode, during which the first subscription may communicate with the first network entity using the two Tx chains. The second subscription may be associated with an idle/inactive mode, during which the first subscription may not use either of the two Tx chains to communicate with the second network entity. The UE may operate in a DSDS mode when the first subscription uses the two Tx chains and the second subscription is in the idle/inactive mode.

As shown by reference number 602, when the second subscription is in the idle/inactive mode, the second subscription may receive a paging message from the second network entity. The second subscription may receive the paging message when the first subscription is in the connected mode and using the two Tx chains.

As shown by reference number 604, after receiving the paging message from the second network entity, the second subscription may temporarily hold a connection setup. In other words, the second subscription may not immediately respond with a paging response to the second network entity. The paging response may not be time critical, and the second subscription may typically take up to a few seconds to respond to the second network entity. Further, the second network entity may transmit another paging message to the second subscription when the second network entity does not receive the paging response within a certain period of time.

As shown by reference number 606, the second subscription may transmit, to the first subscription, a request for the first subscription to enter a DSDA mode, in which the first subscription may operate using one Tx chain and the second subscription may operate using one Tx chain. The second subscription may notify the first subscription to enter the DSDA mode based at least in part on the second subscription receiving the paging message and temporarily holding the connection setup.

As shown by reference number 608, the first subscription may transmit a UAI to the first network entity. The first subscription may transmit the UAI based at least in part on the first subscription receiving the request from the second subscription. The UAI may request an uplink MIMO layer reduction, which may be based at least in part on a reduction from two Tx chains to one Tx chain. The UAI may request a reduction from uplink MIMO (e.g., two Tx chains) to uplink SISO (e.g., one Tx chain). The UAI may include a request for uplink SISO. The UAI may request a component carrier reduction and/or a downlink MIMO layer reduction.

As shown by reference number 610, the UE may start, by the first subscription, a timer based at least in part on transmitting the UAI. The first subscription may reduce the two Tx chains to the one Tx chain based at least in part on a network response not being received from the first network entity after an expiry of the timer. In other words, when the first network entity does not respond relatively soon with the network response, after the timer expires, the first subscription may reduce the two Tx chains to the one Tx chain. The network response may be associated with an indication of the one Tx chain for the first subscription. The first subscription may start the timer based at least in part on transmitting the UAI, where reducing the two Tx chains to the one Tx chain for the first subscription may be based at least in part on the network response not being received from the first network entity after the expiry of the timer. The timer may prevent the first subscription from waiting to receive the network response (e.g., an RRC reconfiguration message and/or a MAC-CE SCell deactivation) from the first network entity for a period of time that satisfies a threshold. In other words, in some cases, the first network entity may not transmit the network response based at least in part on the UAI within a relatively quick period of time, and the first subscription cannot wait an inordinate amount of time to receive the network response.

As shown by reference number 612, the first subscription may reduce the two Tx chains to one Tx chain. In some aspects, the first subscription may reduce the two Tx chains to the one Tx chain based at least in part on the first subscription receiving the network response from the first network entity, which may occur before the expiration of the timer. In some aspects, the first subscription may determine that the timer has expired without the network response being received, and the first subscription may reduce the two Tx chains to one Tx chain based at least in part on the expiration of the timer. In other words, the first subscription may reduce the two Tx chains to one Tx chain based at least in part on the network response not being received from the first network entity after the expiry of the timer. The first subscription may enter the DSDA mode and reduce to the one Tx chain.

As shown by reference number 614, the first subscription may transmit, to the second subscription, an indication that the DSDA mode is now suitable for the second subscription (e.g., an indication for the second subscription to enter the DSDA mode). The first subscription may transmit the indication after the first subscription reduces to the one Tx chain.

As shown by reference number 616, the second subscription may resume the connection setup based at least in part on the indication received from the first subscription. The second subscription may resume the connection setup, which was previously placed on temporary hold by the second subscription after receiving the paging message. The second subscription may transmit the paging response, such as an RRC connection setup message, to the second network entity. The second subscription may receive an RRC reconfiguration message from the network entity based at least in part on the RRC connection setup message.

As shown by reference number 618, the second subscription may transmit a UAI to the second network entity. The second subscription may transmit the UAI based at least in part on the second subscription receiving the RRC reconfiguration message from the second network entity. The UAI may request an uplink MIMO layer reduction, when the second subscription previously indicated a support for uplink MIMO layers. The UAI may request a component carrier reduction and/or a downlink MIMO layer reduction. The UAI may indicate a request for uplink SISO.

As indicated above, FIG. 6 is provided as an example. Other examples may differ from what is described with regard to FIG. 6.

Figure 7:
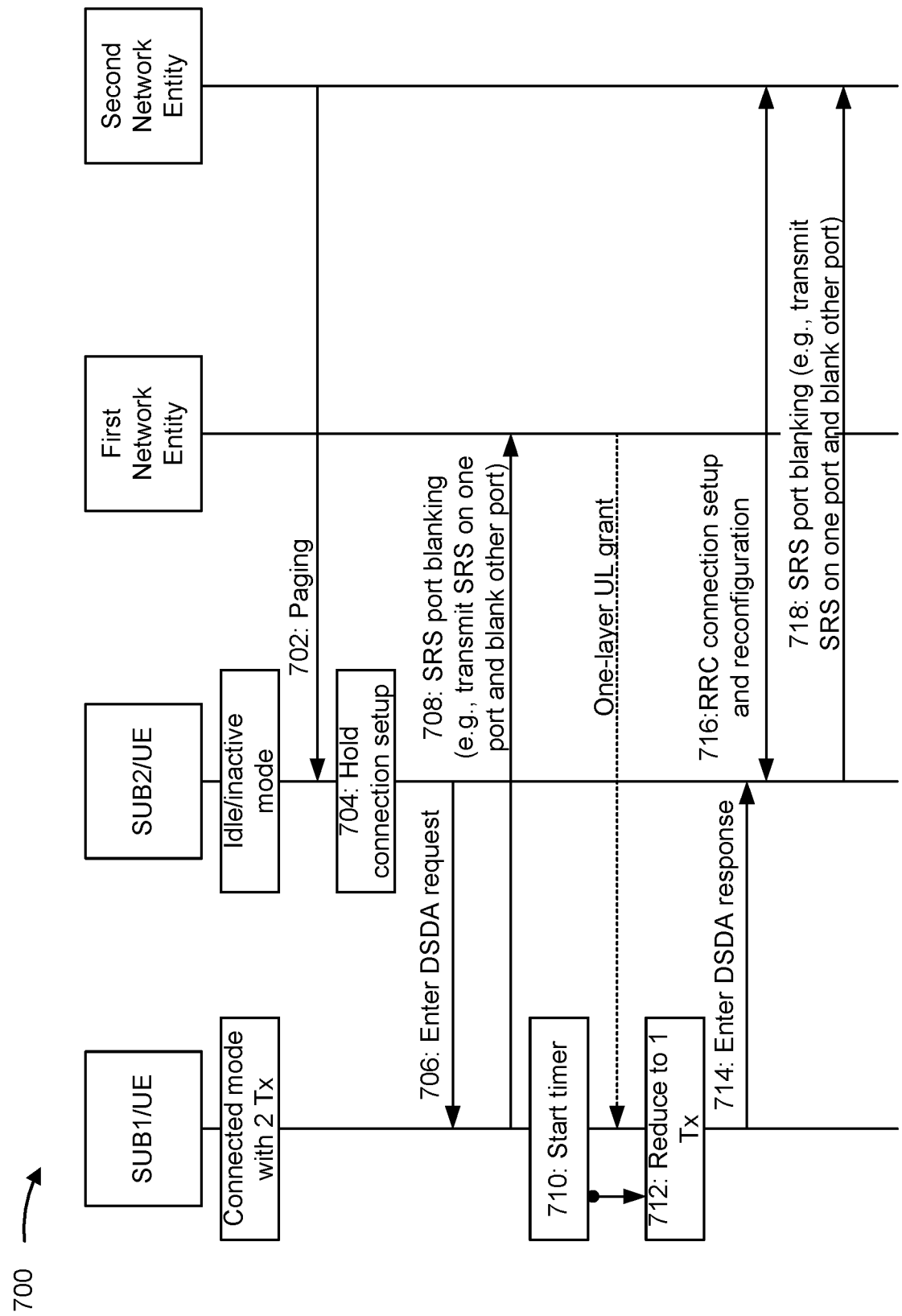

FIG. 7 is a diagram illustrating an example 700 associated with performing a connection setup based at least in part on a paging message, in accordance with the present disclosure. As shown in FIG. 7, example 700 includes communication between a UE (e.g., UE 120), a first network entity (e.g., base station 110*a*), and a second network entity (e.g., base station 110*e*). In some aspects, the UE, the first network entity, and the second network entity may be included in a wireless network, such as wireless network 100.

In some aspects, the UE may include a first subscription and a second subscription. The first subscription may be associated with the first network entity, and the second subscription may be associated with the second network entity. The first subscription may communicate to the first network entity, and the second subscription may communicate to the second network entity. The UE may include two Tx chains.

In some aspects, the first subscription may be associated with a connected mode, during which the first subscription may communicate with the first network entity using the two Tx chains. The second subscription may be associated with an idle/inactive mode, during which the first subscription may not use either of the two Tx chains to communicate with the second network entity. The UE may operate in a DSDS mode when the first subscription uses the two Tx chains, and the second subscription is in the idle/inactive mode.

As shown by reference number 702, when the second subscription is in the idle/inactive mode, the second subscription may receive a paging message from the second network entity. The second subscription may receive the paging message when the first subscription is in the connected mode and using the two Tx chains.

As shown by reference number 704, after receiving the paging message from the second network entity, the second subscription may temporarily hold a connection setup. In other words, the second subscription may not immediately respond with a paging response to the second network entity. The paging response may not be time critical, and the second subscription may typically take up to a few seconds to respond to the second network entity. Further, the second network entity may transmit another paging message to the second subscription when the second network entity does not receive the paging response within a certain period of time.

As shown by reference number 706, the second subscription may transmit, to the first subscription, a request for the first subscription to enter a DSDA mode, in which the first subscription may operate using one Tx chain and the second subscription may operate using one Tx chain. The second subscription may notify the first subscription to enter the DSDA mode based at least in part on the second subscription receiving the paging message and temporarily holding the connection setup.

As shown by reference number 708, the UE may transmit, by the first subscription to the first network entity and based at least in part on the request for the first subscription to enter the mode, an SRS on a first port and a blank on a second port. The first subscription may transmit the SRS (or multiple SRSs) to the first network entity. The first subscription may transmit the SRS for an uplink MIMO codebook on one port (e.g., the first port), and the first subscription may blank the other port (e.g., the second port). In other words, the first subscription may perform an SRS port blanking, in which the first subscription transmits the SRS on one port and blanks the other port. In some aspects, the first subscription may transmit the SRS to the first network entity instead of transmitting a UAI to the first network entity, such as when the UAI is not supported by the UE and/or the first network entity. By transmitting the SRS instead of the UAI, the first subscription may effectively request an uplink MIMO layer reduction. In other words, transmitting the SRS may effectively request a reduction from uplink MIMO (e.g., two Tx chains) to uplink SISO (e.g., one Tx chain).

As shown by reference number 710, the UE may start, by the first subscription, a timer based at least in part on transmitting the SRS. The first subscription may reduce the two Tx chains to the one Tx chain based at least in part on a network response not being received from the first network entity after an expiry of the timer. The first subscription may start the timer after transmitting the SRS to the first network entity. The first subscription may start the timer to provide the first network entity with time to observe an SRS change. In some cases, the first network entity may need the multiple SRSs to observe the SRS change. The first network entity may observe the SRS change and start scheduling a one-layer uplink transmission. The timer may provide a needed time delay. The UE may receive, by the first subscription and from the first network entity, a single-layer uplink grant associated with a single-layer uplink transmission. The first subscription may receive, from the first network entity, the one-layer uplink grant associated with the scheduled one-layer uplink transmission. The first subscription may wait for the one-layer uplink grant to confirm that the first network entity has updated a rank used for uplink scheduling, and the first subscription may early terminate the timer. The one-layer uplink grant may effectively cause the first subscription to use only one Tx chain.

As shown by reference number 712, the first subscription may reduce the two Tx chains to one Tx chain. In some aspects, the first subscription may reduce the two Tx chains to the one Tx chain based at least in part on the first subscription receiving a network response (e.g., the one-layer uplink grant) from the first network entity, which may occur before the expiration of the timer. In some aspects, the first subscription may determine that the timer has expired without the network response being received, and the first subscription may reduce the two Tx chains to one Tx chain based at least in part on the expiration of the timer. In other words, the first subscription may reduce the two Tx chains to one Tx chain based at least in part on the network response not being received from the first network entity after the expiry of the timer. The first subscription may enter the DSDA mode and reduce to the one Tx chain.

As shown by reference number 714, the first subscription may transmit, to the second subscription, an indication that the DSDA mode is now suitable for the second subscription. The first subscription may transmit the indication after the first subscription reduces to the one Tx chain.

As shown by reference number 716, the second subscription may resume the connection setup based at least in part on the indication received from the first subscription. The second subscription may resume the connection setup, which was previously placed on temporary hold by the second subscription after receiving the paging message. The second subscription may transmit the paging response, such as an RRC connection setup message, to the second network entity. The second subscription may receive an RRC reconfiguration message from the network entity based at least in part on the RRC connection setup message.

As shown by reference number 718, the UE may transmit, by the second subscription to the second network entity and based at least in part on the connection setup, an SRS on a first port and a blank on a second port. The second subscription may transmit the SRS (or multiple SRSs) to the second network entity. The second subscription may transmit the SRS when the second subscription and/or the second network entity does not support UAI. The second subscription may transmit the SRS for an uplink MIMO codebook on one port, and the second subscription may blank the other port. In other words, the first subscription may perform an SRS port blanking, in which the first subscription transmits the SRS on one port and blanks the other port. By transmitting the SRS instead of the UAI, the second subscription may effectively request an uplink MIMO layer reduction or request an uplink SISO.

As indicated above, FIG. 7 is provided as an example. Other examples may differ from what is described with regard to FIG. 7.

Figure 8:
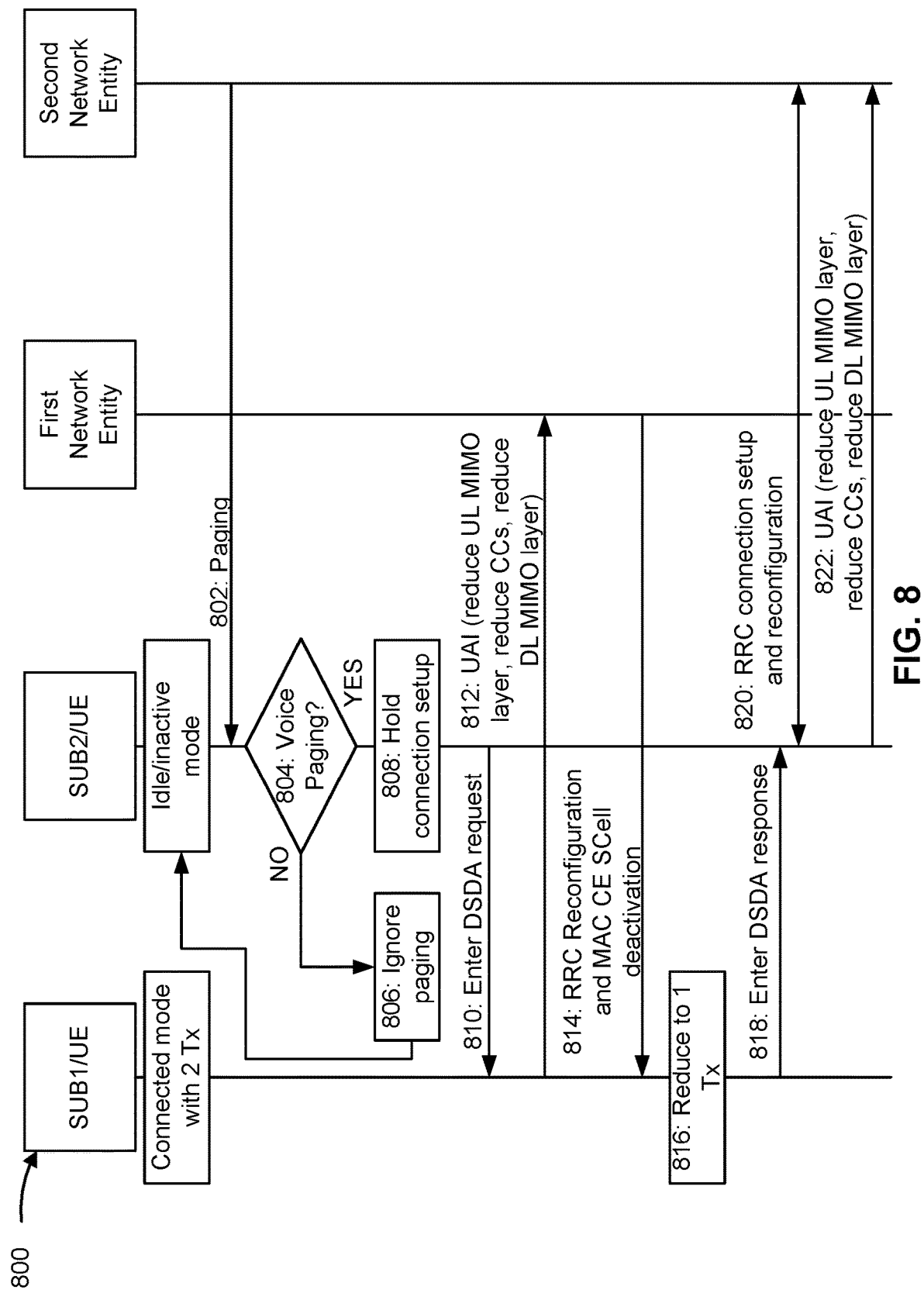

FIG. 8 is a diagram illustrating an example 800 associated with performing a connection setup based at least in part on a paging message, in accordance with the present disclosure. As shown in FIG. 8, example 800 includes communication between a UE (e.g., UE 120), a first network entity (e.g., base station 110*a*), and a second network entity (e.g., base station 110*e*). In some aspects, the UE, the first network entity, and the second network entity may be included in a wireless network, such as wireless network 100.

In some aspects, the UE may include a first subscription and a second subscription. The first subscription may be associated with the first network entity, and the second subscription may be associated with the second network entity. The first subscription may communicate to the first network entity, and the second subscription may communicate to the second network entity. The UE may include two Tx chains.

In some aspects, the first subscription may be associated with a connected mode, during which the first subscription may communicate with the first network entity using the two Tx chains. The second subscription may be associated with an idle/inactive mode, during which the first subscription may not use either of the two Tx chains to communicate with the second network entity. The UE may operate in a DSDS mode when the first subscription uses the two Tx chains, and the second subscription is in the idle/inactive mode.

As shown by reference number 802, when the second subscription is in the idle/inactive mode, the second subscription may receive a paging message from the second network entity. The second subscription may receive the paging message when the first subscription is in the connected mode and using the two Tx chains.

As shown by reference number 804, the UE may determine, by the second subscription and based at least in part on the paging message, whether the paging message includes a voice indication. The second subscription may determine whether the paging message includes the voice indication (e.g., the paging is associated with a voice call). In other words, the second subscription may determine whether the paging message is associated with a voice paging. The UE may determine, by the second subscription and based at least in part on the paging message, that the paging message does not include the voice indication, and the UE may ignore, by the second subscription, the paging message, as shown by reference number 806. When the paging message is not associated with the voice paging, the second subscription may ignore the paging message and return to the idle/inactive mode. The second subscription may ignore the paging message because the second subscription because the DSDA mode may only allow a new call for voice. When the paging message is associated with the voice paging, the second subscription may temporarily hold a connection setup, as shown by reference number 808. In other words, the second subscription may not immediately respond with a paging response to the second network entity. The paging response may not be time critical, and the second subscription may typically take up to a few seconds to respond to the second network entity. Further, the second network entity may transmit another paging message to the second subscription when the second network entity does not receive the paging response within a certain period of time.

As shown by reference number 810, the second subscription may transmit, to the first subscription, a request for the first subscription to enter a DSDA mode, in which the first subscription may operate using one Tx chain and the second subscription may operate using one Tx chain. The second subscription may notify the first subscription to enter the DSDA mode based at least in part on the second subscription receiving the paging message and temporarily holding the connection setup.

As shown by reference number 812, the first subscription may transmit a UAI to the first network entity. The first subscription may transmit the UAI based at least in part on the first subscription receiving the request from the second subscription. The UAI may request an uplink MIMO layer reduction, which may be based at least in part on a reduction from two Tx chains to one Tx chain. The UAI may request a reduction from uplink MIMO (e.g., two Tx chains) to uplink SISO (e.g., one Tx chain). The UAI may include a request for uplink SISO. The UAI may request a component carrier reduction and/or a downlink MIMO layer reduction.

As shown by reference number 814, the first subscription may receive, from the first network entity, a network response based at least in part on the UAI. The network response may include an RRC reconfiguration message. The RRC reconfiguration message may indicate a change to uplink SISO, which may be based at least in part on the UAI that requested the uplink MIMO layer reduction. The RRC reconfiguration message may indicate the component carrier reduction and/or the downlink MIMO layer reduction (e.g., a reduction to two downlink MIMO layers). The network response may include a MAC-CE SCell deactivation to reduce a quantity of component carriers.

As shown by reference number 816, the first subscription may reduce the two Tx chains to one Tx chain, based at least in part on the network response (e.g., the RRC reconfiguration and/or the MAC-CE SCell deactivation) received from the first network entity. The first subscription may enter the DSDA mode and reduce to the one Tx chain.

As shown by reference number 818, the first subscription may transmit, to the second subscription, an indication that the DSDA mode is now suitable for the second subscription. The first subscription may transmit the indication after the first subscription reduces to the one Tx chain.

As shown by reference number 820, the second subscription may resume the connection setup based at least in part on the indication received from the first subscription. The second subscription may resume the connection setup, which was previously placed on temporary hold by the second subscription after receiving the paging message. The second subscription may transmit the paging response, such as an RRC connection setup message, to the second network entity. The second subscription may receive an RRC reconfiguration message from the network entity based at least in part on the RRC connection setup message.

As shown by reference number 822, the second subscription may transmit a UAI to the second network entity. The second subscription may transmit the UAI based at least in part on the second subscription receiving the RRC reconfiguration message from the second network entity. The UAI may request an uplink MIMO layer reduction, when the second subscription previously indicated a support for uplink MIMO layers. The UAI may request a component carrier reduction and/or a downlink MIMO layer reduction. The UAI may indicate a request for uplink SISO.

As indicated above, FIG. 8 is provided as an example. Other examples may differ from what is described with regard to FIG. 8.

In some aspects, with respect to FIGS. 5-8 as described above, the UE may perform transmission operations using controller/processor 280, transmit processor 264, TX MIMO processor 266, modem 254, antenna 252, and/or memory 282. The UE may perform reception operations using antenna 252, modem 254, MIMO detector 256, receive processor 258, controller/processor 280, and/or memory 282). The UE may perform processing operations (e.g., establishing, performing, starting, determining, and/or ignoring) using controller/processor 280 and/or memory 282. In some aspects, with respect to FIGS. 5-8 as described above, the first network entity and the second network entity may perform transmission operations using controller/processor 240, transmit processor 220, TX MIMO processor 230, modem 232, antenna 234, and/or memory 242. The first network entity and the second network entity may perform reception operations using antenna 234, modem 232, MIMO detector 236, receive processor 238, controller/processor 240, and/or memory 242. The first network entity and the second network entity may perform processing operations using controller/processor 240 and/or memory 242.

Figure 9:
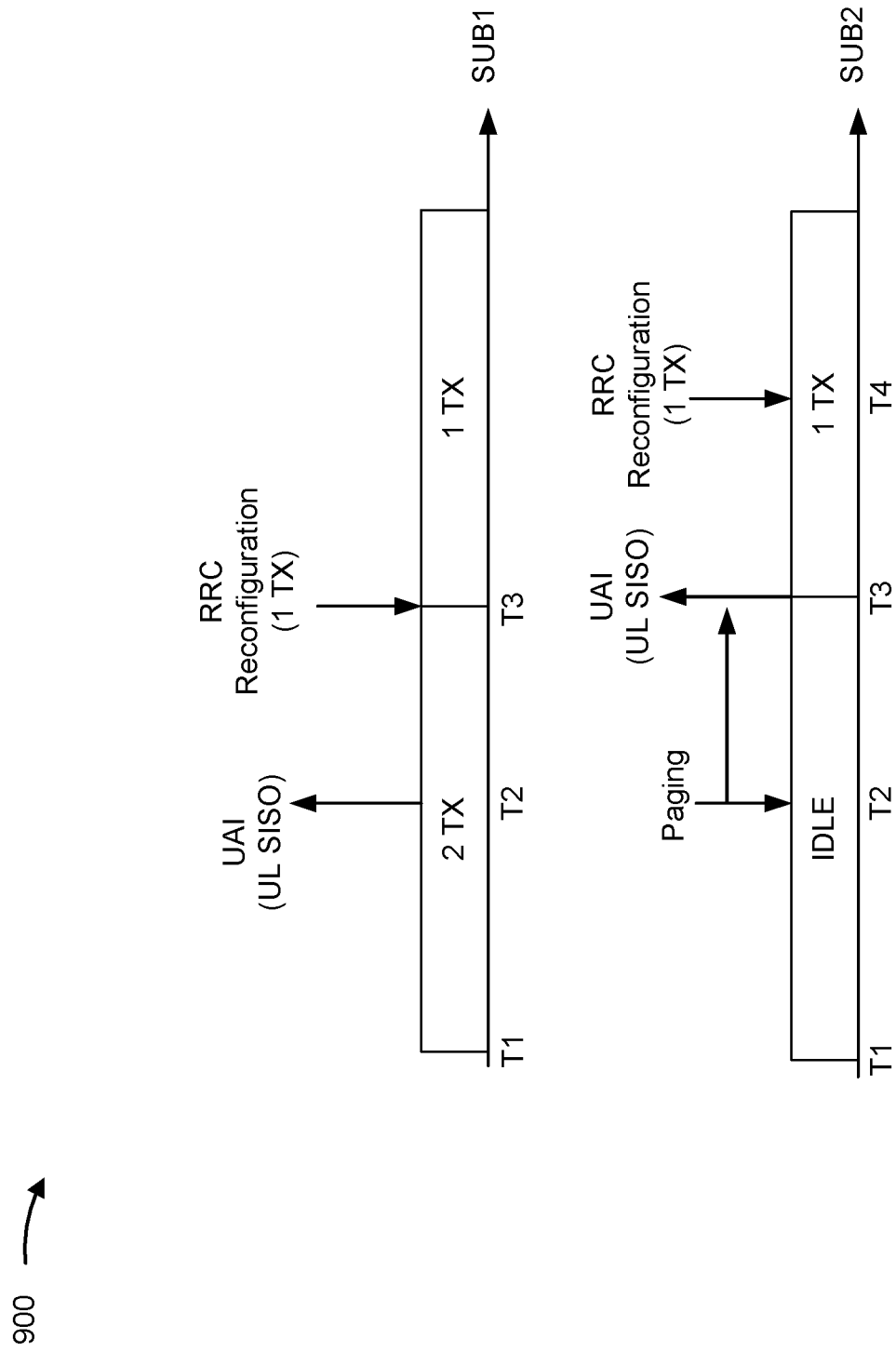

FIG. 9 is a diagram illustrating an example 900 of performing a connection setup based at least in part on a paging message, in accordance with the present disclosure.

As shown in FIG. 9, at a first time (T1), the first subscription may operate using two Tx chains and the second subscription may be idle. At a second time (T2), the second subscription may receive a paging message, and the first subscription may transmit a UAI. The UAI may indicate a request for uplink SISO, or the UAI may indicate a request for an uplink MIMO layer reduction. At the second time, the second subscription may continue to be ide and may not yet switch to one Tx chain. At a third time (T3), the first subscription may receive an RRC reconfiguration that indicates one Tx chain, which may be based at least in part on the UAI. At the third time, the second subscription may switch to the one Tx chain and transmit a paging response for performing the connection setup At the third time, the second subscription may transmit a UAI that indicates a request for uplink SISO. At a fourth time (T4), the second subscription may receive an RRC reconfiguration that indicates one Tx chain. second In some aspects, the first subscription may not immediately switch to the one Tx chain after transmitting the UAI, and the second subscription may not immediately switch to one Tx chain after receiving the paging message, which may otherwise cause the first subscription to experience a relatively high BLER. Rather, the second subscription may wait to switch to the one Tx chain until after the first subscription receives the RRC reconfiguration that indicates the one Tx chain. As a result, the first subscription may not experience the relatively high BLER after the paging message is received. In some aspects, the first subscription may enter a DSDA mode in a connected mode and reduce to the one Tx chain after a network reconfiguration (e.g., after receiving the RRC reconfiguration), and then the second subscription may respond to the paging message because paging may be delayed for a period of time (e.g., a few seconds) without losing a voice call.

In some aspects, the uplink MIMO layer reduction may apply to a reduction from three downlink component carriers and two uplink component carriers to two downlink component carriers and one uplink component carrier, or the uplink MIMO layer reduction may apply to a reduction from four downlink MIMO layers to two downlink MIMO layers.

As indicated above, FIG. 9 is provided as an example. Other examples may differ from what is described with regard to FIG. 9.

Figure 10:
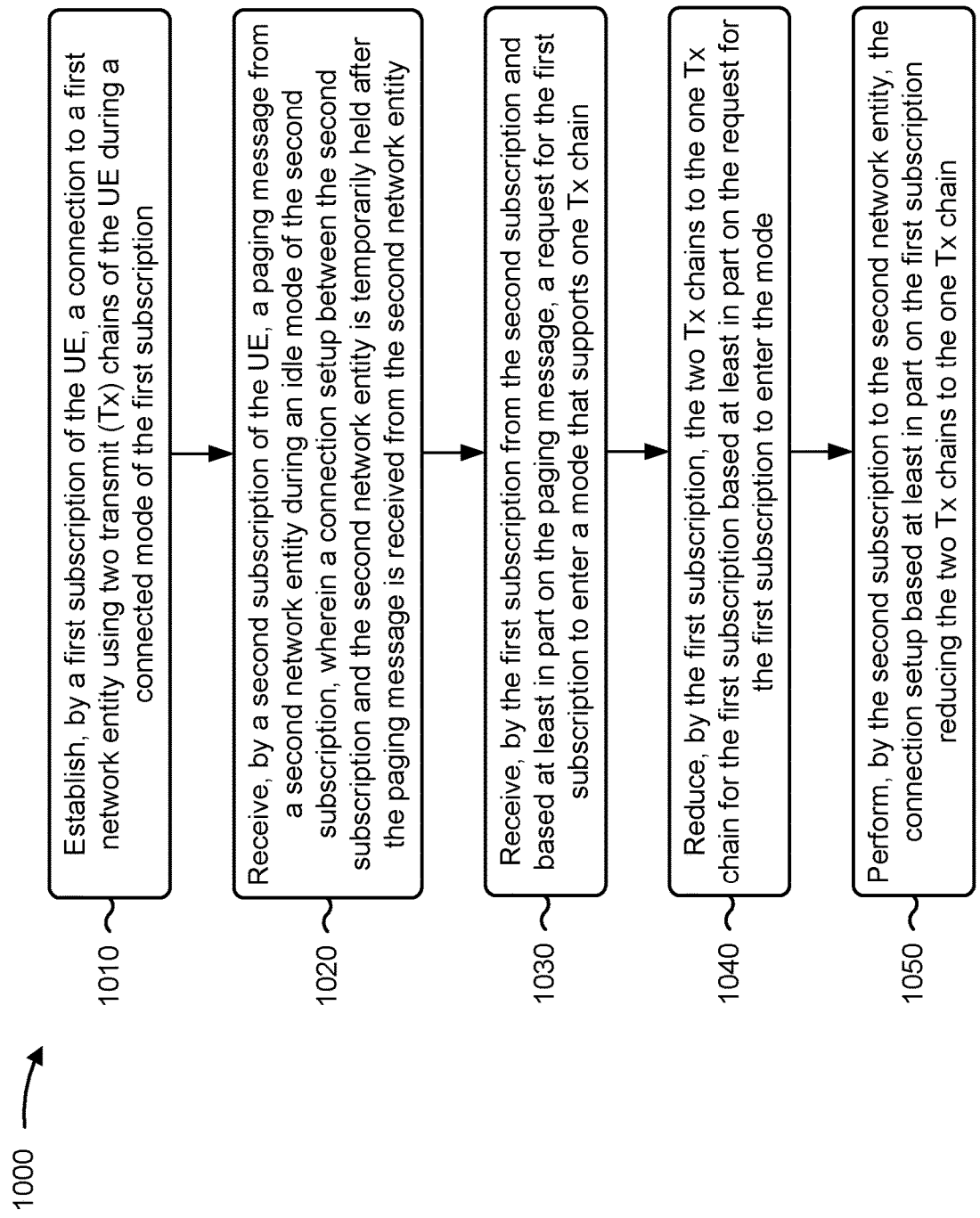
FIG. 10 is a diagram illustrating an example process associated with performing a connection setup based at least in part on a paging message, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with performing a connection setup based at least in part on a paging message.

As shown in FIG. 10, in some aspects, process 1000 may include establishing, by a first subscription of the UE, a connection to a first network entity using two Tx chains of the UE during a connected mode of the first subscription (block 1010). For example, the UE (e.g., using communication manager 140 and/or reception component 1102 and/or transmission component 1104, depicted in FIG. 11) may establish, by a first subscription of the UE, a connection to a first network entity using two Tx chains of the UE during a connected mode of the first subscription, as described above.

As further shown in FIG. 10, in some aspects, process 1000 may include receiving, by a second subscription of the UE, a paging message from a second network entity during an idle mode of the second subscription, wherein a connection setup between the second subscription and the second network entity is temporarily held after the paging message is received from the second network entity (block 1020). For example, the UE (e.g., using communication manager 140 and/or reception component 1102, depicted in FIG. 11) may receive, by a second subscription of the UE, a paging message from a second network entity during an idle mode of the second subscription, wherein a connection setup between the second subscription and the second network entity is temporarily held after the paging message is received from the second network entity, as described above.

As further shown in FIG. 10, in some aspects, process 1000 may include receiving, by the first subscription from the second subscription and based at least in part on the paging message, a request for the first subscription to enter a mode that supports one Tx chain (block 1030). For example, the UE (e.g., using communication manager 140) may receive, by the first subscription from the second subscription and based at least in part on the paging message, a request for the first subscription to enter a mode that supports one Tx chain, as described above.

As further shown in FIG. 10, in some aspects, process 1000 may include reducing, by the first subscription, the two Tx chains to the one Tx chain for the first subscription based at least in part on the request for the first subscription to enter the mode (block 1040). For example, the UE (e.g., using communication manager 140 and/or reduction component 1108, depicted in FIG. 11) may reduce, by the first subscription, the two Tx chains to the one Tx chain for the first subscription based at least in part on the request for the first subscription to enter the mode, as described above.

As further shown in FIG. 10, in some aspects, process 1000 may include performing, by the second subscription to the second network entity, the connection setup based at least in part on the first subscription reducing the two Tx chains to the one Tx chain (block 1050). For example, the UE (e.g., using communication manager 140 and/or reception component 1102 and/or transmission component 1104, depicted in FIG. 11) may perform, by the second subscription to the second network entity, the connection setup based at least in part on the first subscription reducing the two Tx chains to the one Tx chain, as described above.

Process 1000 may include additional aspects, such as any single aspect or any combination of aspects described below and/or in connection with one or more other processes described elsewhere herein.

In a first aspect, process 1000 includes transmitting, by the first subscription to the first network entity and based at least in part on the request for the first subscription to enter the mode, UAI that indicates one or more of a request for an uplink MIMO layer reduction, a request for a component carrier reduction, or a request for a downlink MIMO layer reduction.

In a second aspect, alone or in combination with the first aspect, process 1000 includes receiving, by the first subscription from the first network entity and based at least in part on the UAI, a network response that indicates the one Tx chain for the first subscription.

In a third aspect, alone or in combination with one or more of the first and second aspects, the network response is an RRC reconfiguration, and the RRC reconfiguration indicates one or more of an uplink SISO layer configuration, a component carrier reduction, or a downlink MIMO layer reduction.

In a fourth aspect, alone or in combination with one or more of the first through third aspects, process 1000 includes receiving, by the first subscription from the first network entity and based at least in part on the UAI, a MAC-CE SCell deactivation to reduce a quantity of component carriers associated with the first subscription.

In a fifth aspect, alone or in combination with one or more of the first through fourth aspects, process 1000 includes transmitting, by the first subscription to the second subscription and based at least in part on the first subscription reducing the two Tx chains to the one Tx chain, an indication that the second subscription is now suited to enter the mode that supports DSDA; transmitting, by the second subscription to the second network entity and based at least in part on entering the mode that supports DSDA, a paging response for performing the connection setup; and receiving, by the second subscription from the second network entity and based at least in part on the connection setup of the second subscription, a reconfiguration associated with entering the mode that supports DSDA.

In a sixth aspect, alone or in combination with one or more of the first through fifth aspects, process 1000 includes transmitting, by the second subscription to the second network entity and based at least in part on the connection setup of the second subscription, UAI that indicates one or more of a request for an uplink MIMO layer reduction, a request for a component carrier reduction, or a request for a downlink MIMO layer reduction.

In a seventh aspect, alone or in combination with one or more of the first through sixth aspects, process 1000 includes starting, by the first subscription, a timer based at least in part on transmitting the UAI, wherein reducing the two Tx chains to the one Tx chain for the first subscription is based at least in part on a network response not being received from the first network entity before an expiry of the timer, and the network response is associated with an indication of the one Tx chain for the first subscription.

In an eighth aspect, alone or in combination with one or more of the first through seventh aspects, process 1000 includes transmitting, by the first subscription to the first network entity and based at least in part on the request for the first subscription to enter the mode, an SRS on a first port and a blank on a second port; and starting, by the first subscription, a timer based at least in part on transmitting the SRS, wherein reducing the two Tx chains to the one Tx chain for the first subscription is based at least in part on a network response not being received from the first network entity before an expiry of the timer, and the network response is associated with an indication of the one Tx chain for the first subscription.

In a ninth aspect, alone or in combination with one or more of the first through eighth aspects, process 1000 includes receiving, by the first subscription and from the first network entity, a single-layer uplink grant associated with a single-layer uplink transmission; and performing, by the first subscription, an early termination of the timer.

In a tenth aspect, alone or in combination with one or more of the first through ninth aspects, process 1000 includes transmitting, by the second subscription to the second network entity and based at least in part on the connection setup, an SRS on a first port and a blank on a second port.

In an eleventh aspect, alone or in combination with one or more of the first through tenth aspects, process 1000 includes determining, by the second subscription and based at least in part on the paging message, that the paging message includes a voice indication, wherein the connection setup between the second subscription and the second network entity is temporarily held based at least in part on the paging message including the voice indication.

In a twelfth aspect, alone or in combination with one or more of the first through eleventh aspects, process 1000 includes determining, by the second subscription and based at least in part on the paging message, that the paging message does not include a voice indication; and ignoring, by the second subscription, the paging message.

In a thirteenth aspect, alone or in combination with one or more of the first through twelfth aspects, the connection setup between the second subscription and the second network entity is temporarily held after the paging message is received from the second network entity to avoid a relatively high BLER at the first subscription after reducing the two Tx chains to the one Tx chain.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
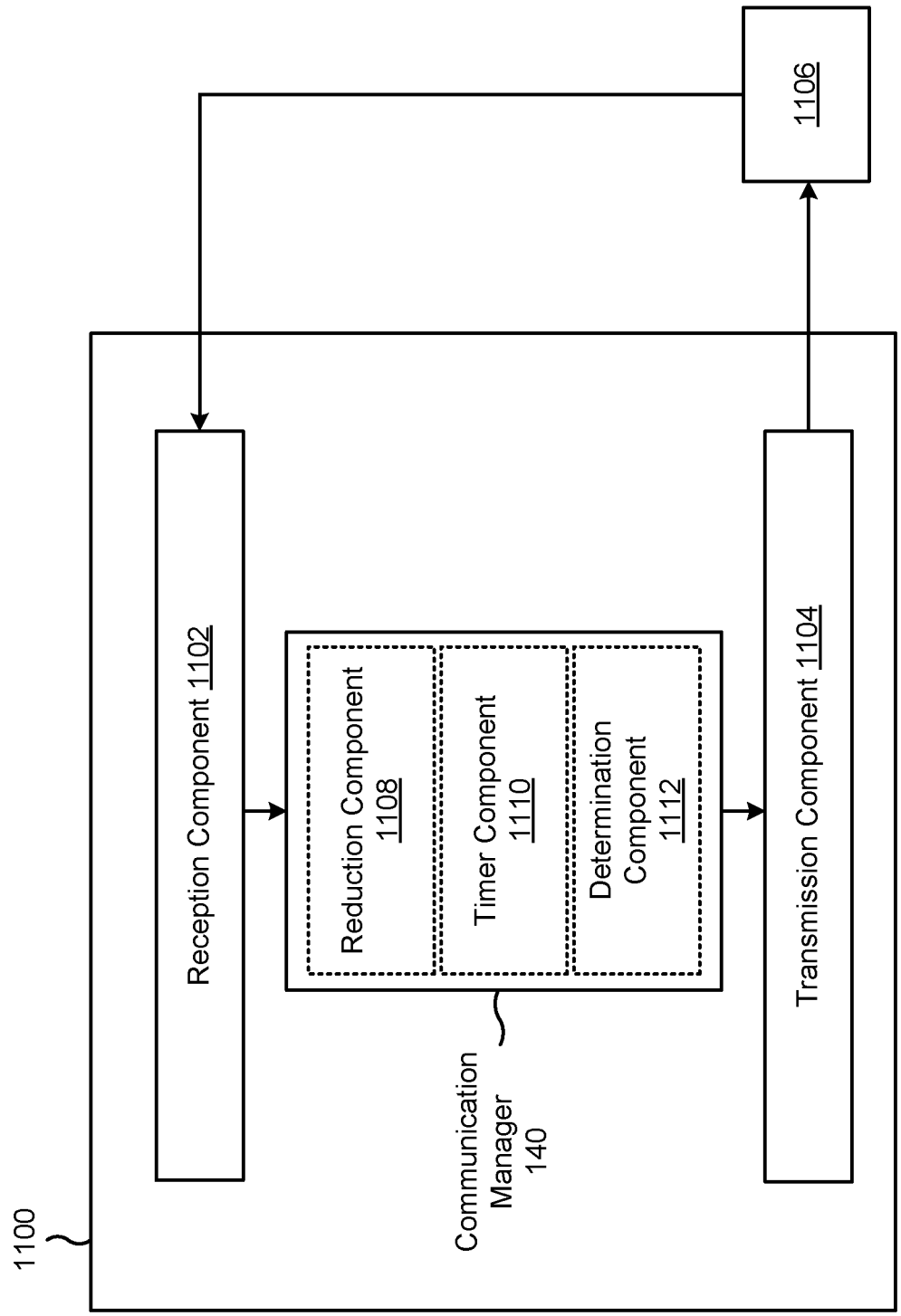
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a reduction component 1108, a timer component 1110, and/or a determination component 1112, among other examples.

In some aspects, the apparatus 1100 may be configured to perform one or more operations described herein in connection with FIGS. 5-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 and/or transmission component 1104 may establish, by a first subscription, a connection to a first network entity using two Tx chains of the UE during a connected mode of the first subscription. The reception component 1102 may receive, by a second subscription, a paging message from a second network entity during an idle mode of the second subscription, wherein a connection setup between the second subscription and the second network entity is temporarily held after the paging message is received from the second network entity. The reduction component 1108 may reduce, by the first subscription, the two Tx chains to the one Tx chain for the first subscription based at least in part on a request for the first subscription to enter a mode that supports one Tx chain. The reception component 1102 and/or transmission component 1104 may perform the connection setup based at least in part on the first subscription reducing the two Tx chains to the one Tx chain.

The transmission component 1104 may transmit, by the first subscription to the first network entity and based at least in part on the request for the first subscription to enter the mode, UAI that indicates one or more of: a request for an uplink MIMO layer reduction, a request for a component carrier reduction, or a request for a downlink MIMO layer reduction. The reception component 1102 may receive, by the first subscription from the first network entity and based at least in part on the UAI, a network response that indicates the one Tx chain for the first subscription. The reception component 1102 may receive, by the first subscription from the first network entity and based at least in part on the UAI, a MAC-CE SCell deactivation to reduce a quantity of component carriers associated with the first subscription. The transmission component 1104 may by the second subscription to the second network entity and based at least in part on the connection setup of the second subscription, UAI that indicates one or more of: a request for an uplink MIMO layer reduction, a request for a component carrier reduction, or a request for a downlink MIMO layer reduction.

The timer component 1110 may start, by the first subscription, a timer based at least in part on transmitting the UAI, wherein reducing the two Tx chains to the one Tx chain for the first subscription is based at least in part on a network response not being received from the first network entity before an expiry of the timer. The transmission component 1104 may transmit, by the first subscription to the first network entity and based at least in part on the request for the first subscription to enter the mode, an SRS on a first port and a blank on a second port. The timer component 1110 may start, by the first subscription, a timer based at least in part on transmitting the SRS, wherein reducing the two Tx chains to the one Tx chain for the first subscription is based at least in part on a network response not being received from the first network entity before an expiry of the timer.

The determination component 1112 may determine, by the second subscription and based at least in part on the paging message, that the paging message includes a voice indication, wherein the connection setup between the second subscription and the second network entity is temporarily held based at least in part on the paging message including the voice indication. The determination component 1112 may determine, by the second subscription and based at least in part on the paging message, that the paging message does not include a voice indication, and ignore the paging message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: establishing, by a first subscription of the UE, a connection to a first network entity using two transmit (Tx) chains of the UE during a connected mode of the first subscription; receiving, by a second subscription of the UE, a paging message from a second network entity during an idle mode of the second subscription, wherein a connection setup between the second subscription and the second network entity is temporarily held after the paging message is received from the second network entity; receiving, by the first subscription from the second subscription and based at least in part on the paging message, a request for the first subscription to enter a mode that supports one Tx chain; reducing, by the first subscription, the two Tx chains to the one Tx chain for the first subscription based at least in part on the request for the first subscription to enter the mode; and performing, by the second subscription to the second network entity, the connection setup based at least in part on the first subscription reducing the two Tx chains to the one Tx chain.

Aspect 2: The method of Aspect 1, further comprising: transmitting, by the first subscription to the first network entity and based at least in part on the request for the first subscription to enter the mode, UE assistance information (UAI) that indicates one or more of: a request for an uplink multiple-input multiple-output (MIMO) layer reduction, a request for a component carrier reduction, or a request for a downlink MIMO layer reduction.

Aspect 3: The method of Aspect 2, further comprising: receiving, by the first subscription from the first network entity and based at least in part on the UAI, a network response that indicates the one Tx chain for the first subscription.

Aspect 4: The method of Aspect 3, wherein the network response is a radio resource control (RRC) reconfiguration, and wherein the RRC reconfiguration indicates one or more of: an uplink single-input single-output layer configuration, a component carrier reduction, or a downlink multiple-input multiple-output layer reduction.

Aspect 5: The method of Aspect 2, further comprising: receiving, by the first subscription from the first network entity and based at least in part on the UAI, a medium access control control element secondary cell deactivation to reduce a quantity of component carriers associated with the first subscription.

Aspect 6: The method of any of Aspects 1 through 5, further comprising: transmitting, by the first subscription to the second subscription and based at least in part on the first subscription reducing the two Tx chains to the one Tx chain, an indication that the second subscription is now suited to enter the mode that supports dual subscriber identification module (SIM) dual-active (DSDA); transmitting, by the second subscription to the second network entity and based at least in part on entering the mode that supports DSDA, a paging response for performing the connection setup; and receiving, by the second subscription from the second network entity and based at least in part on the connection setup of the second subscription, a reconfiguration associated with entering the mode that supports DSDA.

Aspect 7: The method of any of Aspects 1 through 6, further comprising: transmitting, by the second subscription to the second network entity and based at least in part on the connection setup of the second subscription, UE assistance information (UAI) that indicates one or more of: a request for an uplink multiple-input multiple-output (MIMO) layer reduction, a request for a component carrier reduction, or a request for a downlink MIMO layer reduction.

Aspect 8: The method of Aspect 2, further comprising: starting, by the first subscription, a timer based at least in part on transmitting the UAI, wherein reducing the two Tx chains to the one Tx chain for the first subscription is based at least in part on a network response not being received from the first network entity before an expiry of the timer, and wherein the network response is associated with an indication of the one Tx chain for the first subscription.

Aspect 9: The method of any of Aspects 1 through 8, further comprising: transmitting, by the first subscription to the first network entity and based at least in part on the request for the first subscription to enter the mode, a sounding reference signal (SRS) on a first port and a blank on a second port; and starting, by the first subscription, a timer based at least in part on transmitting the SRS, wherein reducing the two Tx chains to the one Tx chain for the first subscription is based at least in part on a network response not being received from the first network entity before an expiry of the timer, and wherein the network response is associated with an indication of the one Tx chain for the first subscription.

Aspect 10: The method of Aspect 9, further comprising: receiving, by the first subscription and from the first network entity, a single-layer uplink grant associated with a single-layer uplink transmission; and performing, by the first subscription, an early termination of the timer.

Aspect 11: The method of any of Aspects 1 through 10, further comprising: transmitting, by the second subscription to the second network entity and based at least in part on the connection setup, a sounding reference signal (SRS) on a first port and a blank on a second port.

Aspect 12: The method of any of Aspects 1 through 11, further comprising: determining, by the second subscription and based at least in part on the paging message, that the paging message includes a voice indication, wherein the connection setup between the second subscription and the second network entity is temporarily held based at least in part on the paging message including the voice indication.

Aspect 13: The method of any of Aspects 1 through 12, further comprising: determining, by the second subscription and based at least in part on the paging message, that the paging message does not include a voice indication; and ignoring, by the second subscription, the paging message.

Aspect 14: The method of any of Aspects 1 through 13, wherein the connection setup between the second subscription and the second network entity is temporarily held after the paging message is received from the second network entity to avoid a relatively high block error rate at the first subscription after reducing the two Tx chains to the one Tx chain.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      establish, by a first subscription of the UE, a connection to a first network entity using two transmit (Tx) chains of the UE during a connected mode of the first subscription;
      receive, by a second subscription of the UE, a paging message for a voice call from a second network entity during an idle mode of the second subscription; and reduce, by the first subscription, the two Tx chains to one Tx chain for the first subscription based at least in part on the reception of the paging message for the voice call.

2. The apparatus of claim 1, wherein the one or more processors are further configured to:
transmit, by the first subscription to the first network entity, UE assistance information (UAI) that indicates one or more of: a preference for an uplink multiple-input multiple-output (MIMO) layer reduction, or a preference for a component carrier reduction.

3. The apparatus of claim 2, wherein the one or more processors are further configured to:
receive, by the first subscription from the first network entity and based at least in part on the UAI, a network response that indicates the one Tx chain for the first subscription.

4. The apparatus of claim 3, wherein the network response is a radio resource control (RRC) reconfiguration, and wherein the RRC reconfiguration indicates one or more of: an uplink single-input single-output layer configuration, a component carrier reduction, or a downlink multiple-input multiple-output layer reduction.

5. The apparatus of claim 2, wherein the one or more processors are further configured to:
receive, by the first subscription from the first network entity and based at least in part on the UAI, a medium access control control element secondary cell deactivation to reduce a quantity of component carriers associated with the first subscription.

6. The apparatus of claim 2, wherein the one or more processors are further configured to:
start, by the first subscription, a timer based at least in part on the UAI transmitted to the first network entity, wherein reducing the two Tx chains to the one Tx chain for the first subscription is based at least in part on a network response not being received from the first network entity before an expiry of the timer, and wherein the network response is associated with an indication of the one Tx chain for the first subscription.

7. The apparatus of claim 1, wherein the one or more processors are further configured to:
transmit, by the first subscription to the second subscription and based at least in part on the first subscription reducing the two Tx chains to the one Tx chain, an indication that the second subscription is now suited to enter a mode that supports dual subscriber identification module (SIM) dual-active (DSDA);
transmit, by the second subscription to the second network entity and based at least in part on entering the mode that supports DSDA, a paging response for performing a connection setup; and
receive, by the second subscription from the second network entity and based at least in part on the connection setup of the second subscription, a reconfiguration associated with entering the mode that supports DSDA.

8. The apparatus of claim 1, wherein the one or more processors are further configured to:
transmit, by the second subscription to the second network entity, UE assistance information (UAI) that indicates one or more of: a preference for an uplink multiple-input multiple-output (MIMO) layer reduction, or a preference for a component carrier reduction.

9. The apparatus of claim 1, wherein the one or more processors are further configured to:
transmit, by the first subscription to the first network entity, a sounding reference signal (SRS) on a first port and a blank on a second port; and
start, by the first subscription, a timer based at least in part on transmitting the SRS, wherein reducing the two Tx chains to the one Tx chain for the first subscription is based at least in part on a network response not being received from the first network entity before an expiry of the timer, and wherein the network response is associated with an indication of the one Tx chain for the first subscription.

10. The apparatus of claim 9, wherein the one or more processors are further configured to:
receive, by the first subscription and from the first network entity, a single-layer uplink grant associated with a single-layer uplink transmission; and
perform, by the first subscription, an early termination of the timer.

11. The apparatus of claim 1, wherein the one or more processors are further configured to:
transmit, by the second subscription to the second network entity, a sounding reference signal (SRS) on a first port and a blank on a second port.

12. The apparatus of claim 1, wherein the one or more processors are further configured to:
determine, by the second subscription and based at least in part on the paging message, that the paging message includes a voice indication, wherein a connection setup between the second subscription and the second network entity is temporarily held based at least in part on the paging message including the voice indication.

13. The apparatus of claim 1, wherein a connection setup between the second subscription and the second network entity is temporarily held after the paging message is received from the second network entity to avoid a relatively high block error rate at the first subscription after reducing the two Tx chains to the one Tx chain.

14. The apparatus of claim 1, wherein the paging message for a voice call includes a voice indication.

15. A method of wireless communication performed by a user equipment (UE), comprising:
establishing, by a first subscription of the UE, a connection to a first network entity using two transmit (Tx) chains of the UE during a connected mode of the first subscription;
receiving, by a second subscription of the UE, a paging message for a voice call from a second network entity during an idle mode of the second subscription; and
reducing, by the first subscription, the two Tx chains to one Tx chain for the first subscription based at least in part on the reception of the paging message for the voice call.

16. The method of claim 15, further comprising:
transmitting, by the first subscription to the first network entity, UE assistance information (UAI) that indicates one or more of: a preference for an uplink multiple-input multiple-output (MIMO) layer reduction, or a preference for a component carrier reduction.

17. The method of claim 16, further comprising:
receiving, by the first subscription from the first network entity and based at least in part on the UAI, a network response that indicates the one Tx chain for the first subscription.

18. The method of claim 17, wherein the network response is a radio resource control (RRC) reconfiguration, and wherein the RRC reconfiguration indicates one or more of: an uplink single-input single-output layer configuration, a component carrier reduction, or a downlink multiple-input multiple-output layer reduction.

19. The method of claim 16, further comprising:
receiving, by the first subscription from the first network entity and based at least in part on the UAI, a medium access control control element secondary cell deactivation to reduce a quantity of component carriers associated with the first subscription.

20. The method of claim 16, further comprising:
starting, by the first subscription, a timer based at least in part on transmitting the UAI, wherein reducing the two Tx chains to the one Tx chain for the first subscription is based at least in part on a network response not being received from the first network entity before an expiry of the timer, and wherein the network response is associated with an indication of the one Tx chain for the first subscription.

21. The method of claim 15, further comprising:
transmitting, by the first subscription to the second subscription and based at least in part on the first subscription reducing the two Tx chains to the one Tx chain, an indication that the second subscription is now suited to enter a mode that supports dual subscriber identification module (SIM) dual-active (DSDA);
transmitting, by the second subscription to the second network entity and based at least in part on entering the mode that supports DSDA, a paging response for performing a connection setup; and
receiving, by the second subscription from the second network entity and based at least in part on the connection setup of the second subscription, a reconfiguration associated with entering the mode that supports DSDA.

22. The method of claim 15, further comprising:
transmitting, by the second subscription to the second network entity, UE assistance information (UAI) that indicates one or more of: a preference for an uplink multiple-input multiple-output (MIMO) layer reduction, or a preference for a component carrier reduction.

23. The method of claim 15, further comprising:
transmitting, by the first subscription to the first network entity, a sounding reference signal (SRS) on a first port and a blank on a second port; and
starting, by the first subscription, a timer based at least in part on transmitting the SRS, wherein reducing the two Tx chains to the one Tx chain for the first subscription is based at least in part on a network response not being received from the first network entity before an expiry of the timer, and wherein the network response is associated with an indication of the one Tx chain for the first subscription.

24. The method of claim 23, further comprising:
receiving, by the first subscription and from the first network entity, a single-layer uplink grant associated with a single-layer uplink transmission; and
performing, by the first subscription, an early termination of the timer.

25. The method of claim 15, further comprising:
transmitting, by the second subscription to the second network entity, a sounding reference signal (SRS) on a first port and a blank on a second port.

26. The method of claim 15, further comprising:
determining, by the second subscription and based at least in part on the paging message, that the paging message includes a voice indication, wherein a connection setup between the second subscription and the second network entity is temporarily held based at least in part on the paging message including the voice indication.

27. The method of claim 15, wherein the paging message for a voice call includes a voice indication.

28. The method of claim 15, wherein a connection setup between the second subscription and the second network entity is temporarily held after the paging message is received from the second network entity to avoid a relatively high block error rate at the first subscription after reducing the two Tx chains to the one Tx chain.

29. A non-transitory computer-readable medium storing a set of instructions for wireless communication, the set of instructions comprising:
one or more instructions that, when executed by one or more processors of a user equipment (UE), cause the UE to:
establish, by a first subscription of the UE, a connection to a first network entity using two transmit (Tx) chains of the UE during a connected mode of the first subscription;
receive, by a second subscription of the UE, a paging message for a voice call from a second network entity during an idle mode of the second subscription; and
reduce, by the first subscription, the two Tx chains to one Tx chain for the first subscription based at least in part on the reception of the paging message for the voice call.

30. An apparatus for wireless communication, comprising:
means for establishing, by a first subscription of the apparatus, a connection to a first network entity using two transmit (Tx) chains of the apparatus during a connected mode of the first subscription;
means for receiving, by a second subscription of the apparatus, a paging message for a voice call from a second network entity during an idle mode of the second subscription; and
means for reducing, by the first subscription, the two Tx chains to one Tx chain for the first subscription based at least in part on the reception of the paging message for the voice call.

* * * * *